US009657830B2

(12) United States Patent
Masuyama et al.

(10) Patent No.: US 9,657,830 B2
(45) Date of Patent: May 23, 2017

(54) DUMMY SHAFT, APPARATUS FOR ASSEMBLING DIFFERENTIAL UNIT USING DUMMY SHAFT, AND METHOD FOR MANUFACTURING DIFFERENTIAL UNIT

(71) Applicant: TOYOTA JIDOSHA KABUSHIKI KAISHA, Toyota-shi, Aichi (JP)

(72) Inventors: Takahisa Masuyama, Okazaki (JP); Kenichi Saho, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 14/569,232

(22) Filed: Dec. 12, 2014

(65) Prior Publication Data

US 2015/0176693 A1  Jun. 25, 2015

(30) Foreign Application Priority Data

Dec. 25, 2013 (JP) ................. 2013-267625

(51) Int. Cl.
*B23P 19/10* (2006.01)
*F16H 57/023* (2012.01)
*F16H 48/38* (2012.01)
*B23P 19/12* (2006.01)

(52) U.S. Cl.
CPC .......... *F16H 57/023* (2013.01); *F16H 48/38* (2013.01); *B23P 19/10* (2013.01); *B23P 19/12* (2013.01); *F16H 2048/382* (2013.01); *Y10T 29/49465* (2015.01); *Y10T 29/53539* (2015.01); *Y10T 29/53696* (2015.01)

(58) Field of Classification Search
CPC  B23P 19/04; B23P 19/10; B23P 19/12; B23P 2700/50; F16H 57/023; F16H 57/025; F16H 2048/382; F16H 48/42
See application file for complete search history.

(56) References Cited

U.S. PATENT DOCUMENTS

2006/0202439 A1  9/2006  Kahlert et al.
2012/0166048 A1  6/2012  Inoue et al.

FOREIGN PATENT DOCUMENTS

| JP | H108-197355 A | 8/1996 |
|----|---------------|--------|
| JP | 3650155 B2    | 5/2005 |
| JP | 2006-123019 A | 5/2006 |
| JP | 2006-353080 A | 12/2006 |
| JP | 2009-166140 A | 7/2009 |
| JP | 2011-212783 A | 10/2011 |
| JP | 2012-126224 A | 7/2012 |

*Primary Examiner* — Christopher Besler
(74) *Attorney, Agent, or Firm* — Oliff PLC

(57) ABSTRACT

Disclosed is a dummy shaft which prevents washers from falling off. In addition, disclosed are an apparatus for assembling a differential unit using the dummy shaft, and a method for manufacturing the differential unit. Specifically disclosed is a dummy shaft for temporarily assembling a differential unit by being inserted into a pinion gear, and a washer in contact with an outer surface of the pinion gear, including a body portion, and a movable portion slidable in a direction toward or away from the body portion. The movable portion has a receiving groove for catching the washer.

8 Claims, 15 Drawing Sheets

Enlarged view of area Rx

Enlarged view of area Ry

View taken in direction of arrow Fx

View taken in direction of arrow Fy

DUMMY SHAFT, APPARATUS FOR ASSEMBLING DIFFERENTIAL UNIT USING DUMMY SHAFT, AND METHOD FOR MANUFACTURING DIFFERENTIAL UNIT

TECHNICAL FIELD

The present invention relates to a dummy shaft, an apparatus for assembling a differential unit using the dummy shaft, and a method for manufacturing the differential unit.

BACKGROUND ART

Conventionally, there is known a differential unit for absorbing a difference in rotational speed between left and right wheels. The differential unit mainly includes a differential case, a pair of pinion gears which rotates together with the differential case (revolution), and a pair of side gears engaged with the pinion gears. The differential unit absorbs the difference in rotational speed between the left and right wheels by utilizing a fact that rotational speeds of the respective side gears change when the pinion gears rotate (rotation).

There is a differential unit including washers between a differential case and pinion gears. Such a differential unit is completed by inserting a dummy shaft into the pinion gears and the washers, and then replacing the dummy shaft with a pinion shaft (see Patent Literature 1, for example). This is because the pinion gears and the washers are supported in predetermined positions to facilitate insertion of the pinion shaft. However, this step has a problem that the washers fall off the dummy shaft. In particular, this step has a problem that the washers move due to vibration in a conveying step and the washers fall off the dummy shaft.

CITATION LIST

Patent Literature

Patent Literature 1: JP 2006-123019 A

SUMMARY OF INVENTION

Problem to be Solved by the Invention

The objective of the present invention is to provide a dummy shaft which prevents washers from falling off. In addition, another objective of the present invention is to provide an apparatus for assembling a differential unit using the dummy shaft, and a method for manufacturing the differential unit.

Means for Solving the Problem

The problem to be solved by the present invention is as described above, and means for solving the problem is described below.

A first aspect of the invention is a dummy shaft for temporarily assembling a differential unit by being inserted into a pinion gear, and a washer in contact with an outer surface of the pinion gear, including a body portion, and a movable portion slidable in a direction toward or away from the body portion. The movable portion has a receiving groove for catching the washer.

Preferably, when the movable portion is slid toward the body portion, an end of the receiving groove farther from the body portion moves inward of the outer surface of the pinion gear, which faces the washer.

Preferably, the receiving groove has a bottom surface and a slope gradually becoming shallower from an end of the bottom surface.

Preferably, the receiving groove is fit with the washer to restrict rotation of the washer.

Preferably, when the bottom surface of the receiving groove, and a flat surface portion formed in the washer come in contact with each other to restrict rotation of the washer, the bottom surface of the receiving groove faces upward in a vertical direction.

A second aspect of the invention is an apparatus for assembling a differential unit using the dummy shaft, including a fixing device for fixing the differential unit in a predetermined position, the differential unit being in a temporarily assembled state where the dummy shaft is inserted into the pinion gear and the washer, and where the washer is caught in the receiving groove of the dummy shaft, and a pushing device for pushing the dummy shaft inward by using a chuck. The pushing device slides the movable portion toward the body portion by using the chuck to move the washer to a predetermined position.

Preferably, the apparatus further includes a replacing device for sending a pinion shaft into the differential unit which is turned into a predetermined position after the pushing device pushes the dummy shaft inward. The replacing device pushes the dummy shaft outward by using the pinion shaft to replace the dummy shaft with the pinion shaft.

Preferably, the apparatus further includes a conveying device of the differential unit. The conveying device places the temporarily assembled differential unit on the fixing device.

A third aspect of the invention is a method for manufacturing a differential unit using the dummy shaft, including a temporarily assembling step for bringing the differential unit into a temporarily assembled state where the dummy shaft is inserted into the pinion gear and the washer, and where the washer is caught in the receiving groove of the dummy shaft, a fixing step for fixing the differential unit in a predetermined position, and a pushing step for pushing the dummy shaft inward by using a chuck. The pushing step includes sliding the movable portion toward the body portion by using the chuck to move the washer into a predetermined position.

Preferably, the method further includes a replacing step for sending a pinion shaft into the differential unit which is turned into a predetermined position after the dummy shaft is pushed inward through the pushing step. The replacing step includes pushing the dummy shaft outward by using the pinion shaft to replace the dummy shaft with the pinion shaft.

Preferably, the method further includes a conveying step for conveying the differential unit after the temporarily assembling step. The conveying step includes sending the temporarily assembled differential unit to the fixing step.

Effects of the Invention

The present invention exerts the following effects.

The dummy shaft includes a body portion, and a movable portion slidable in a direction toward or away from the body portion. The movable portion has a receiving groove for catching the washer. Accordingly, the washer does not move, thus enabling to prevent the washer from falling off.

In the dummy shaft, when the movable portion is slid toward the body portion, an end of the receiving groove farther from the body portion moves inward of the outer surface of the pinion gear, which faces the washer. This makes it possible to forcibly move the washer caught in the receiving groove so as to move the washer to a predetermined position in a top-bottom direction.

In the dummy shaft, the receiving groove has a bottom surface and a slope gradually becoming shallower from an end of the bottom surface. Accordingly, the washer is not caught by an edge, thus enabling to smoothly move the washer to the predetermined position.

In the dummy shaft, the receiving groove is fit with the washer to restrict rotation of the washer. Accordingly, the washer does not turn, thus enabling to prevent the washer from falling off.

In the dummy shaft, when the bottom surface of the receiving groove, and a flat surface portion formed in the washer come in contact with each other to restrict rotation of the washer, the bottom surface of the receiving groove faces upward in a vertical direction. Accordingly, friction acting on the washer increases, thus enabling to further prevent the washer from falling off.

The apparatus for assembling a differential unit includes a fixing device for fixing the differential unit in a predetermined position, the differential unit being in a temporarily assembled state where the dummy shaft is inserted into the pinion gear and the washer, and where the washer is caught in the receiving groove of the dummy shaft, and a pushing device for pushing the dummy shaft inward by using a chuck. The pushing device slides the movable portion toward the body portion by using the chuck to move the washer to a predetermined position. This makes it possible to automate a part of assembly operation of the differential unit.

The apparatus further includes a replacing device for sending a pinion shaft into the differential unit which is turned into a predetermined position after the pushing device pushes the dummy shaft inward. The replacing device pushes the dummy shaft outward by using the pinion shaft to replace the dummy shaft with the pinion shaft. This makes it possible to automate a part of the assembly operation of the differential unit.

The apparatus further includes a conveying device of the differential unit. The conveying device places the temporarily assembled differential unit on the fixing device. This makes it possible to automate a part of the assembly operation of the differential unit.

The method for manufacturing a differential unit includes a temporarily assembling step for bringing the differential unit into a temporarily assembled state where the dummy shaft is inserted into the pinion gear and the washer, and where the washer is caught in the receiving groove of the dummy shaft, a fixing step for fixing the differential unit in a predetermined position, and a pushing step for pushing the dummy shaft inward by using a chuck. The pushing step includes sliding the movable portion toward the body portion by using the chuck to move the washer into a predetermined position. This makes it possible to facilitate a part of the assembly operation of the differential unit.

The method further includes a replacing step for sending a pinion shaft into the differential unit which is turned into a predetermined position after the dummy shaft is pushed inward through the pushing step. The replacing step includes pushing the dummy shaft outward by using the pinion shaft to replace the dummy shaft with the pinion shaft. This makes it possible to facilitate a part of the assembly operation of the differential unit.

The method further includes a conveying step for conveying the differential unit after the temporarily assembling step. The conveying step includes sending the temporarily assembled differential unit to the fixing step. This makes it possible to facilitate a part of the assembly operation of the differential unit.

DESCRIPTION OF EMBODIMENTS

First, an ordinary differential unit 1 is described briefly.

Figure 1:
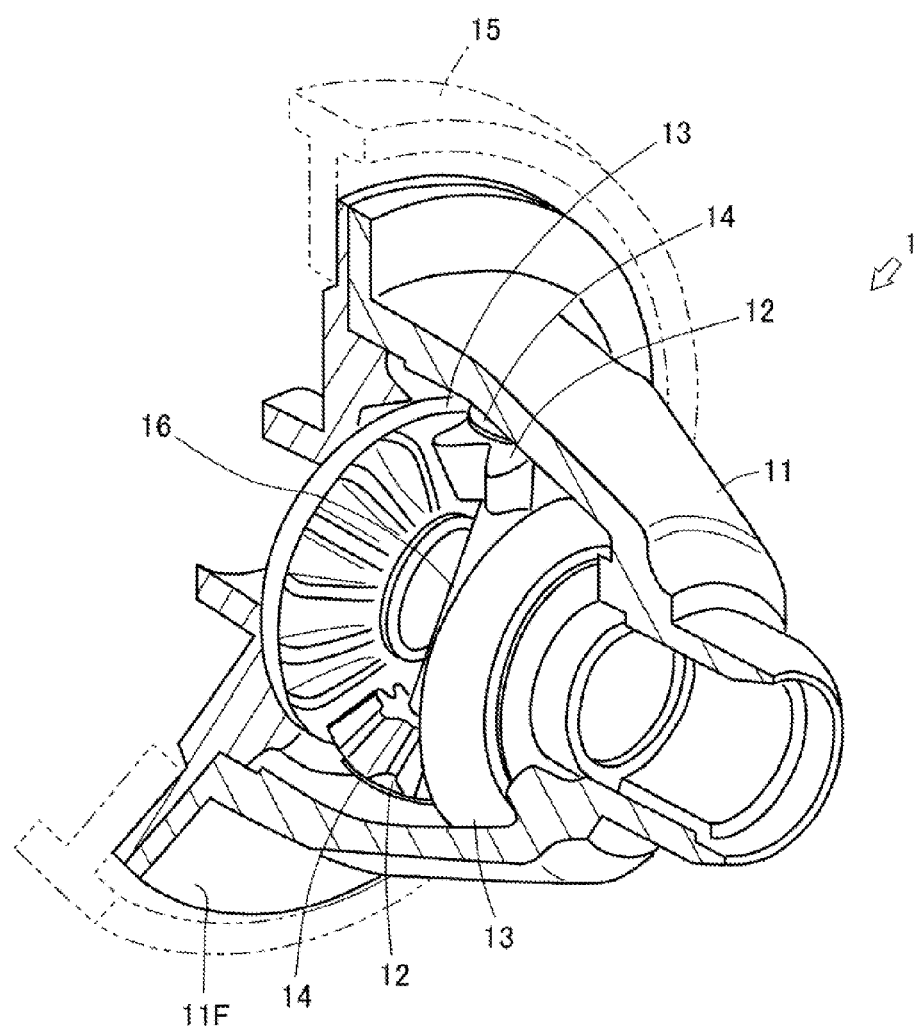
FIG. 1 shows a differential unit.
Figure 2:
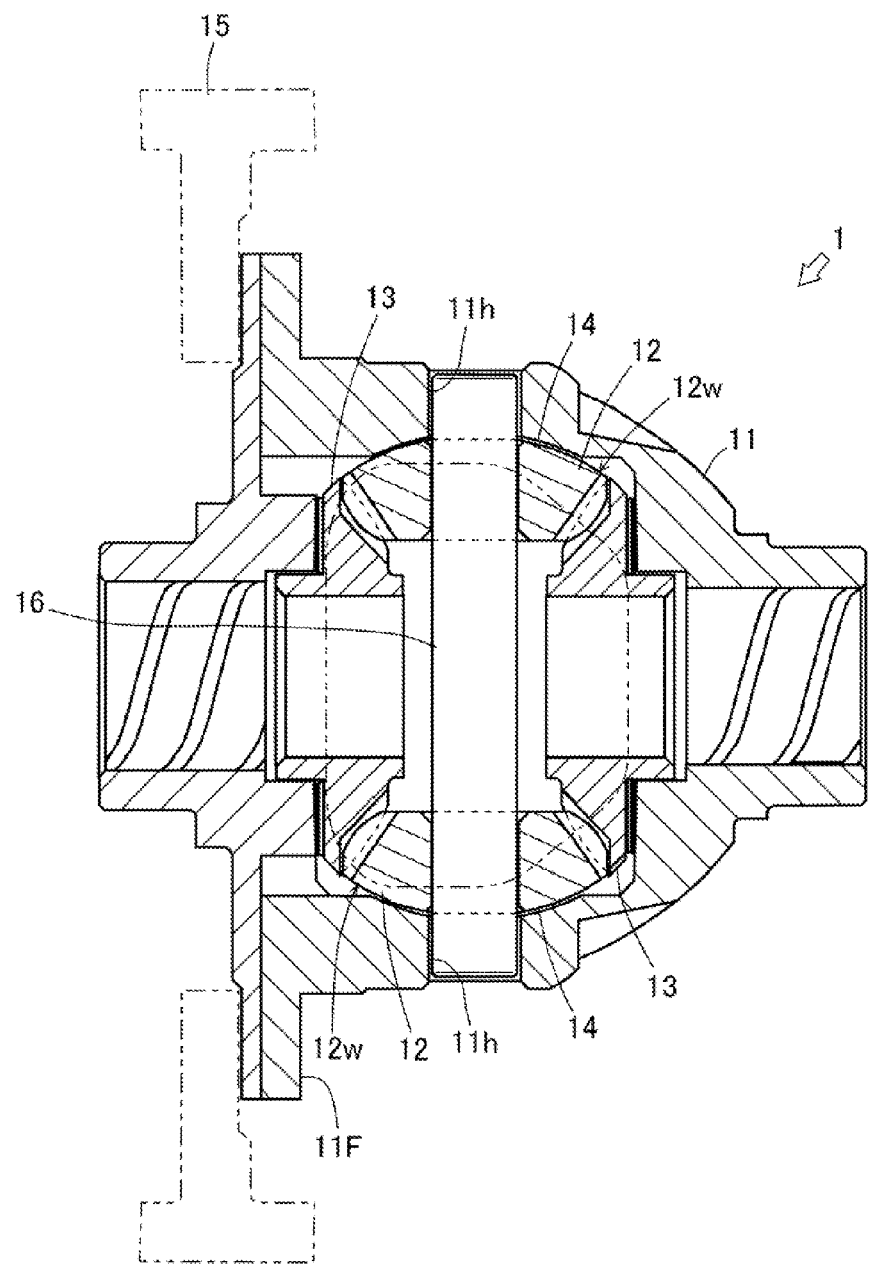
FIG. 2 shows an internal structure of the differential unit.
Figure 3:
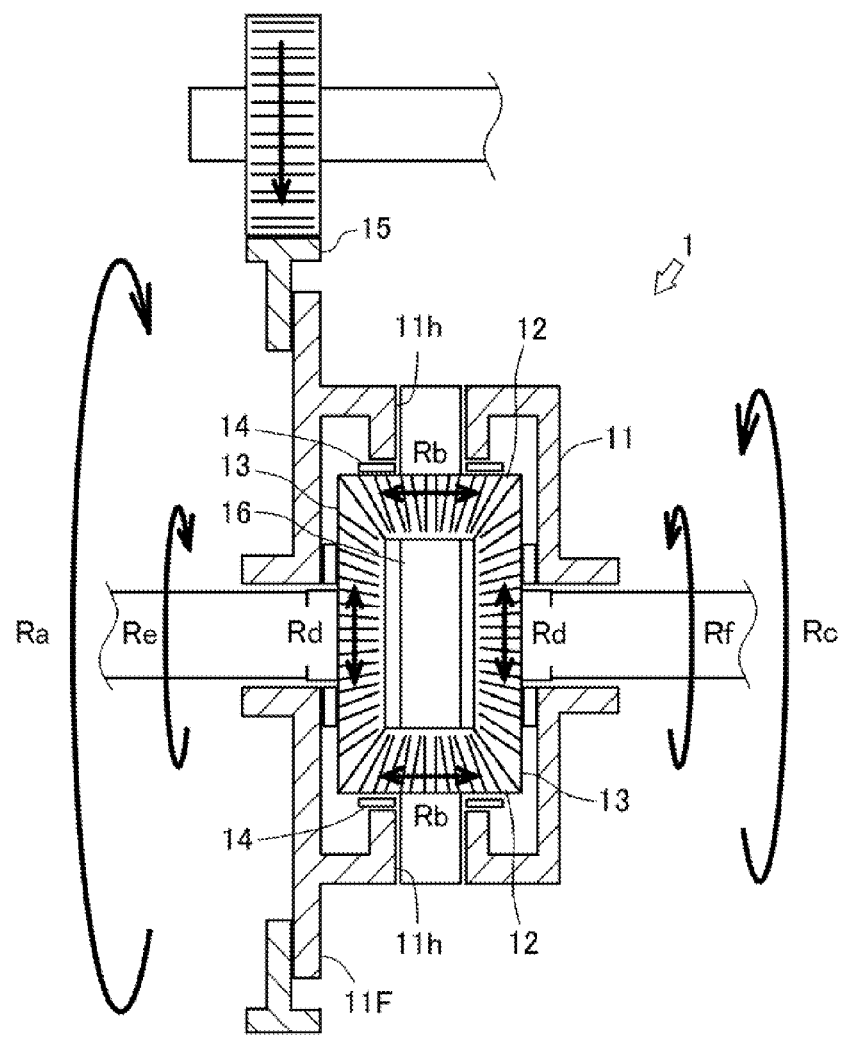
FIG. 3 shows how the differential unit operates.

FIG. 1 shows the differential unit 1. FIG. 2 shows an internal structure of the differential unit 1. FIG. 3 shows how the differential unit 1 operates.

The differential unit 1 absorbs a difference in rotational speed between left and right wheels. The differential unit 1 includes a differential case 11, pinion gears 12, and side gears 13.

The differential case 11 is a hollow component. The differential case 11 has a flange 11F at one end portion thereof, and a final gear 15 is attached to the flange 11F. The differential case 11 rotates integrally with the final gear 15 (see arrow Ra in FIG. 3).

The pinion gears 12 are arranged in the differential case 11. In the present embodiment, the differential unit 1 includes a pair of pinion gears 12 facing each other. The pair of pinion gears 12 is rotatably supported by a pinion shaft 16 (see arrow Rb in FIG. 3). The pinion shaft 16 is supported while inserted in a shaft hole 11h of the differential case 11. Therefore, the pinion gears 12 rotate together with the differential case 11 (see arrow Rc in FIG. 3). When the pinion gears 12 rotate on the pinion shaft 16, this motion is referred to as "rotation", and when the pinion gears 12 rotate together with the differential case 11, this motion is referred to as "revolution".

The side gears 13 are arranged in the differential case 11. The differential unit 1 includes a pair of side gears 13 facing each other. The pair of side gears 13 is rotatably supported while engaged with the pinion gears 12 (see arrow Rd in FIG. 3). Therefore, the side gears 13 rotate as the pinion gears 12 rotate (revolution) (see arrows Re and Rf in FIG.

3). When the pinion gears 12 rotate (rotation) in this state, rotational speeds of the respective side gears 13 change. Concretely, when the pinion gears 12 rotate (rotation) in one direction, a relationship between the rotational speeds of the respective side gears 13 become Re<Rf. On the other hand, when the pinion gears 12 rotate (rotation) in the other direction, the relationship between the rotational speeds of the respective side gears 13 become Re>Rf.

In this manner, the differential unit 1 can absorb the difference in the rotational speed between the left and right wheels by utilizing a fact that the rotational speeds of the respective side gears 13 change when the pinion gears 12 rotate (rotation).

Furthermore, the differential unit 1 includes washers 14.

The washers 14 are arranged in the differential case 11. In the differential unit 1, the washers 14 are arranged between the differential case 11 and the pinion gears 12. In other words, the washers 14 are arranged in contact with outer surfaces 12w of the pinion gears 12. The washers 14 function as slide bearings, and thereby suppress friction of the differential case 11 and the pinion gears 12 to reduce abrasion thereof. Therefore, the pinion gears 12 smoothly rotate for a long period.

Next, a dummy shaft 2 according to an embodiment of the present invention is described.

Figure 4:
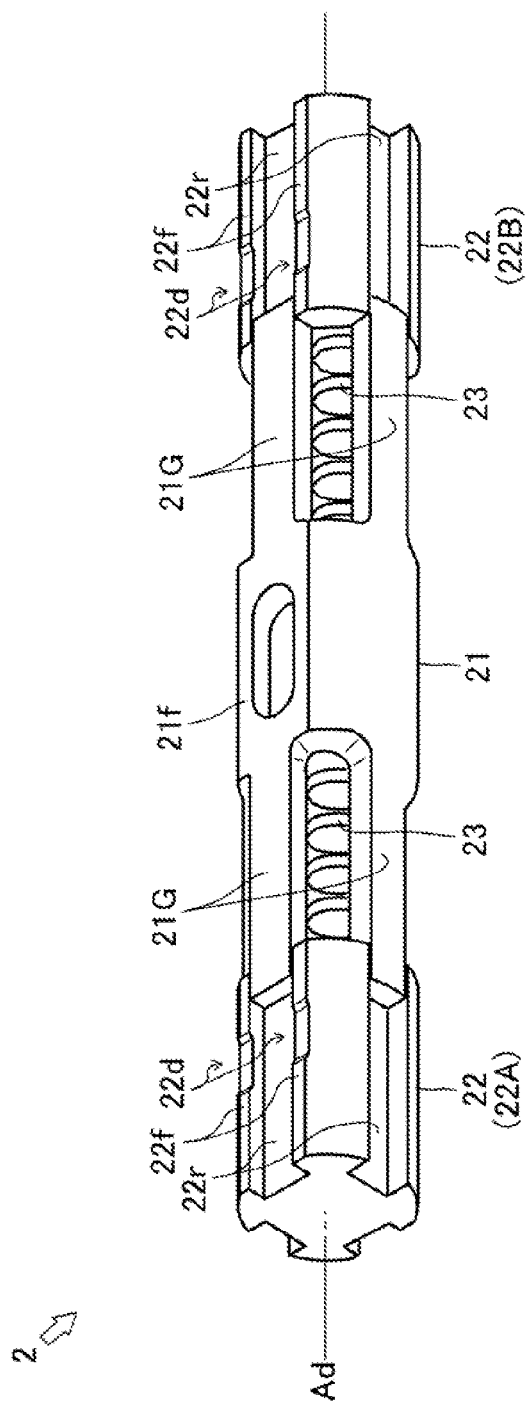
FIG. 4 shows a dummy shaft.

FIG. 4 shows the dummy shaft 2.

The dummy shaft 2 is used in assembling the differential unit 1. The dummy shaft 2 includes a body portion 21 and movable portions 22.

The body portion 21 is formed in a substantially cylindrical shape. A spring 23 is inserted into the body portion 21.

The body portion 21 has a plurality of guides 21G at one end portion thereof. All the guides 21G have the same shapes and are parallel to each other. All the guides 21G are arranged at regular intervals on a circle about an axis Ad. In other words, all the guides 21G are arranged so that phase angles about the axis Ad become equal. The dummy shaft 2 according to the present embodiment is provided with the four guides 21G in total having the phase angles of 90° about the axis Ad.

Furthermore, the body portion 21 also has a plurality of guides 21G at the other end portion thereof. All the guides 21G have the same shapes and are parallel to each other. All the guides 21G are arranged at regular intervals on a circle about the axis Ad. In other words, all the guides 21G are arranged so that phase angles about the axis Ad become equal. The dummy shaft 2 according to the present embodiment is provided with the four guides 21G in total having the phase angles of 90° about the axis Ad.

The movable portions 22 are also formed in substantially cylindrical shapes. The dummy shaft 2 includes the movable portions 22 at opposite ends of the body portion 21. Hereinafter, one of the movable portions 22 is defined as a "movable portion 22A" and the other of the movable portions 22 is defined as a "movable portion 22B".

The movable portion 22A has, on an outer periphery thereof, a plurality of rails 22r along the axis Ad. All the rails 22r have the same shapes and are parallel to each other. All the rails 22r are arranged at regular intervals on a circle about the axis Ad. In other words, all the rails 22r are arranged so that phase angles about the axis Ad become equal. The dummy shaft 2 according to the present embodiment is provided with the four rails 22r in total having the phase angles of 90° about the axis Ad.

Similarly, the movable portion 22B has, on an outer periphery thereof, a plurality of rails 22r along the axis Ad. All the rails 22r have the same shapes and are parallel to each other. All the rails 22r are arranged at regular intervals on a circle about the axis Ad. In other words, all the rails 22r are arranged so that phase angles about the axis Ad become equal. The dummy shaft 2 according to the present embodiment is provided with the four rails 22r in total having the phase angles of 90° about the axis Ad.

The above-described structure enables the movable portions 22A and 22B to be attached to the body portion 21 with the rails 22r and the guides 21G engaged with each other. The rails 22r slide along the guides 21G, and thereby the movable portions 22A and 22B can slide in a direction along the axis Ad (see FIGS. 5 and 6). In other words, the movable portions 22A and 22B can slide in a direction toward or away from the body portion 21. The movable portions 22A and 22B are biased by the spring 23 in directions away from the body portion 21. Therefore, some external force is required to slide the movable portions 22A and 22B toward the body portion 21.

The dummy shaft 2 is further described in detail.

The body portion 21 has a flat surface portion 21f formed parallel to the axis Ad. The flat surface portion 21f is formed from an end of one guide 21G to an end of the other guide 21G. The movable portions 22A and 22B also have flat surface portions 22f formed along the axis Ad. The flat surface portions 22f are formed on opposite longitudinal sides of any one of the rails 22r from one end to the end of each movable portion. The flat surface portion 21f of the body portion 21 and the flat surface portions 22f of the movable portions 22A and 22B come in contact with each other. In other words, the flat surface portion 21f and the flat surface portions 22f form one flat surface without unevenness.

In each of the flat surface portions 22f, a receiving groove 22d is formed as a recess of the flat surface portion 22f. Specifically, the receiving groove 22d has a bottom surface 22db and slopes 22dr formed from ends of the bottom surface 22db to the flat surface portion 22f (see FIGS. 7A and 7B). The bottom surface 22db is substantially parallel to the rail 22r. The straight line connecting the two receiving grooves 22d formed on both sides of the rail 22r is substantially perpendicular to the axis Ad, seen from a direction perpendicular to the flat surface portion 22f.

Next, a manner of using the dummy shaft 2 is described.

Figure 5:
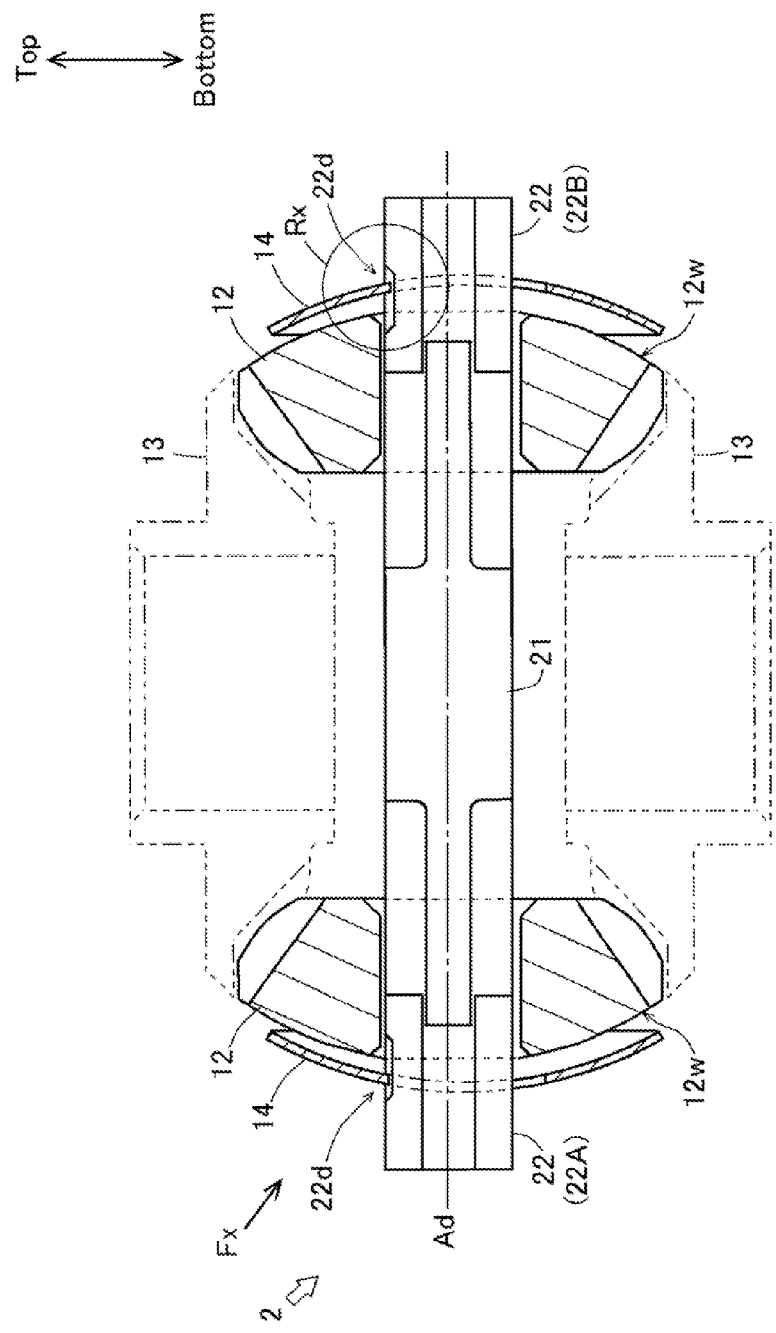
FIG. 5 shows a state where the dummy shaft is inserted into pinion gears and washers.
Figure 6:
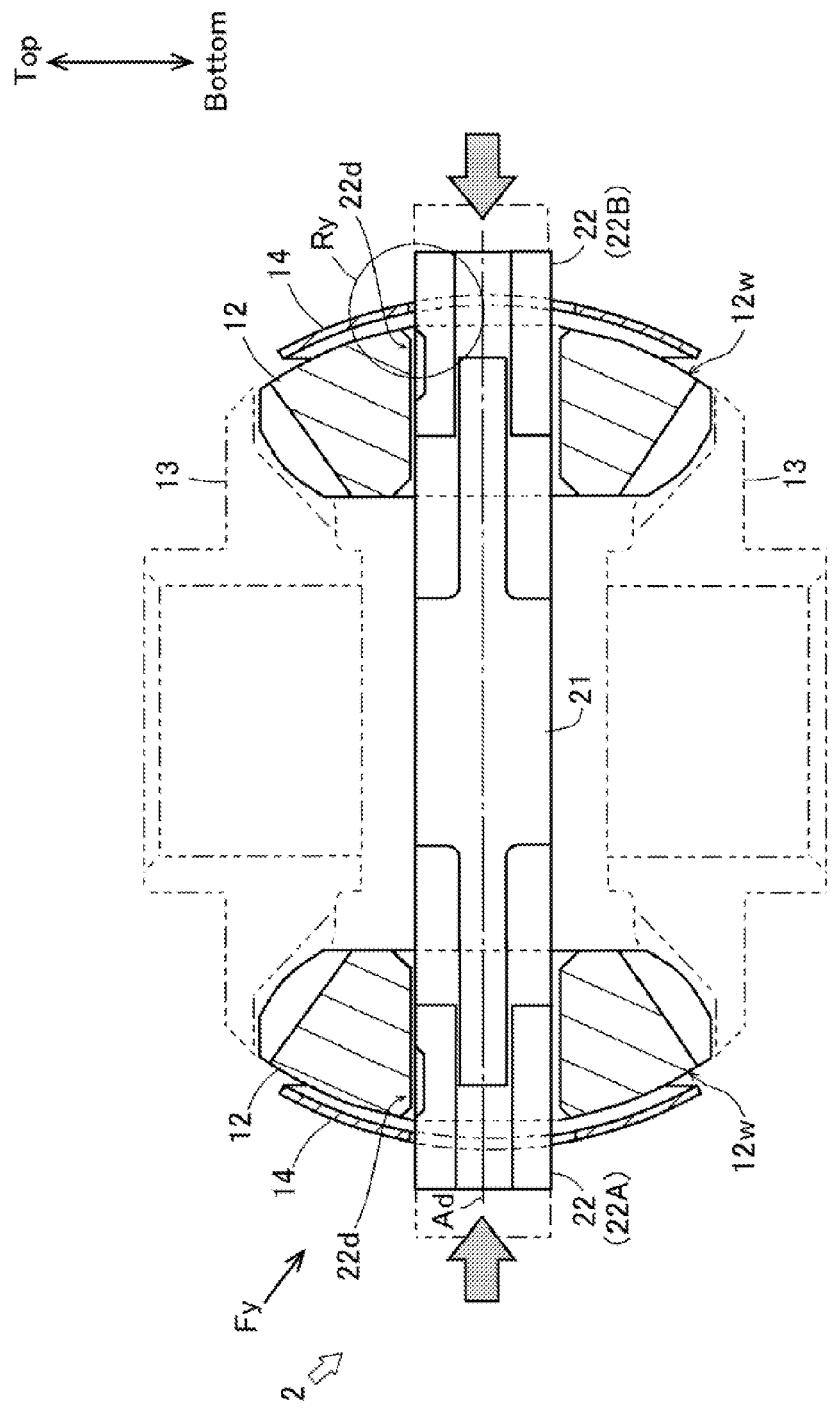
FIG. 6 shows a state where movable portions of the dummy shaft are slid toward a body portion.
Figure 7A:
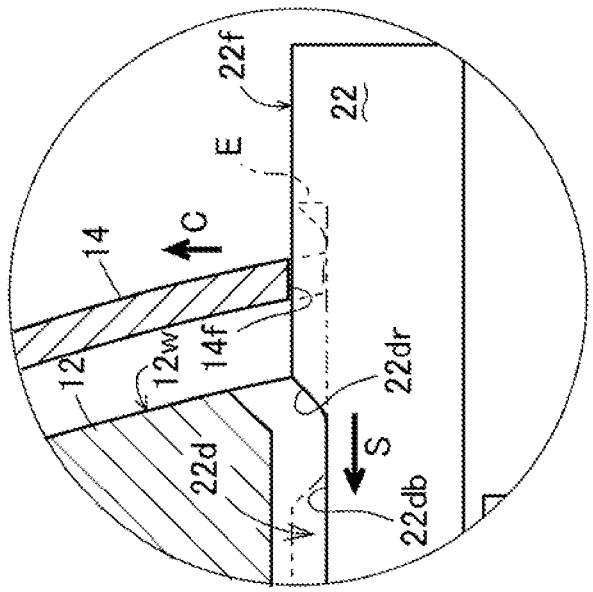
FIGS. 7A and 7B are enlarged views of an area Rx in FIG. 5 and an area Ry in FIG. 6, respectively.
Figure 7B:
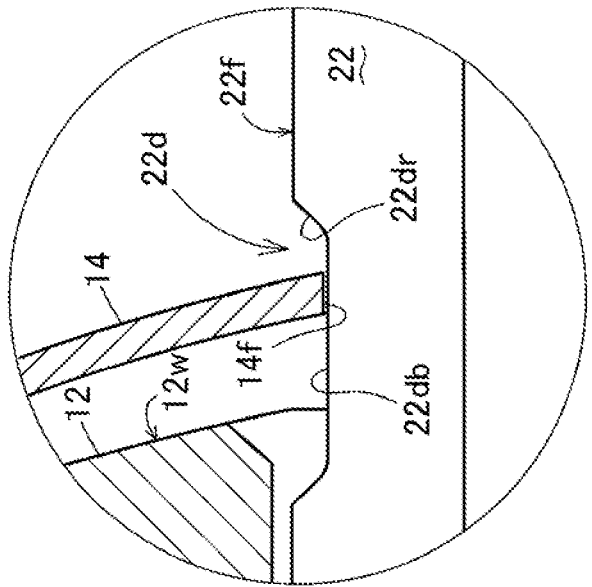

FIG. 5 shows a state where the dummy shaft 2 is inserted into the pinion gears 12 and the washers 14. FIG. 6 shows a state where the movable portions 22 (22A, 22B) of the dummy shaft 2 are slid toward the body portion 21. FIGS. 7A and 7B are enlarged views of an area Rx in FIG. 5 and an area Ry in FIG. 6, respectively. In FIGS. 5 and 6, a top-bottom direction is parallel to a direction of gravitational force.

The dummy shaft 2 is inserted into the pinion gears 12 and the washers 14 to thereby bring the differential unit 1 into a temporarily assembled state. More specifically, the dummy shaft 2 is inserted into the pair of pinion gears 12 facing each other and the two washers 14 in contact with the outer surfaces 12w of the respective pinion gears 12 to thereby bring the differential unit 1 into the temporarily assembled state.

As shown in FIG. 5, the pinion gears 12 are engaged with the side gears 13 to thereby be supported in predetermined positions in a longitudinal direction of the dummy shaft 2. The washers 14 are supported in predetermined positions in the longitudinal direction of the dummy shaft 2 while in contact with (at least in close proximity to) the outer surfaces 12*w* of the respective pinion gears 12. At this time, the washers 14 are caught in the receiving grooves 22*d* (see FIG. 7A).

Thus, the dummy shaft 2 includes the body portion 21 and the movable portions 22 (22A, 22B) which can slide with respect to the body portion 21. The receiving grooves 22*d* for catching the washers 14 are formed in the movable portions 22 (22A, 22B). Accordingly, the washers 14 do not move (are not displaced in the longitudinal direction of the dummy shaft 2), thus enabling to prevent the washers 14 from falling off.

As described above, the differential unit 1 is completed by replacing the dummy shaft 2 with the pinion shaft 16. Therefore, the dummy shaft 2 plays a role in supporting the pinion gears 12 and the washers 14 in proper positions in the top-bottom direction. At this point, the washers 14 have fallen into the receiving groove 22*d*, and therefore are not in the proper positions in the top-bottom direction.

As shown in FIG. 6, the dummy shaft 2 can slide the movable portions 22 (22A, 22B) toward the body portion 21. The receiving groove 22*d* formed in each of the movable portions 22 (22A, 22B) moves toward the body portion 21 (see arrow S in FIG. 7B). Then, an end of the receiving groove 22*d* farther from the body portion 21 moves inward of the outer surface 12*w* of the pinion gear 12. At this time, the washer 14 moves upward along the slope 22*dr* (see arrow C in FIG. 7B). In this manner, the washer 14 moves out of the receiving groove 22*d* to be hung on the flat surface portion 22*f* (see FIG. 7B).

Thus, when each of the movable portions 22 (22A, 22B) of the dummy shaft 2 is slid toward the body portion 21, the end of the receiving groove 22*d* farther from the body portion 21 moves inward of the outer surface 12*w* of the pinion gear 12. Accordingly, the washer 14 caught in the receiving groove 22*d* is forcibly moved (the washer 14 having been fallen into the receiving groove 22*d* is pushed upward), and the washer 14 can be moved to the predetermined position in the top-bottom direction.

In addition, each of the receiving grooves 22*d* of the dummy shaft 2 has the bottom surface 22*db* and the slopes 22*dr* gradually becoming shallower from the ends of the bottom surface 22*db*. Accordingly, each of the washers 14 does not get caught by an edge (a side wall in the case where the slope 22*dr* is not provided (see two-dot chain line E in FIG. 7B)), and thereby the washer 14 can be smoothly moved to the predetermined position.

Next, a reason why the flat surface portions 22*f* are formed on the movable portions 22 (22A, 22B) is described.

Figure 8A:
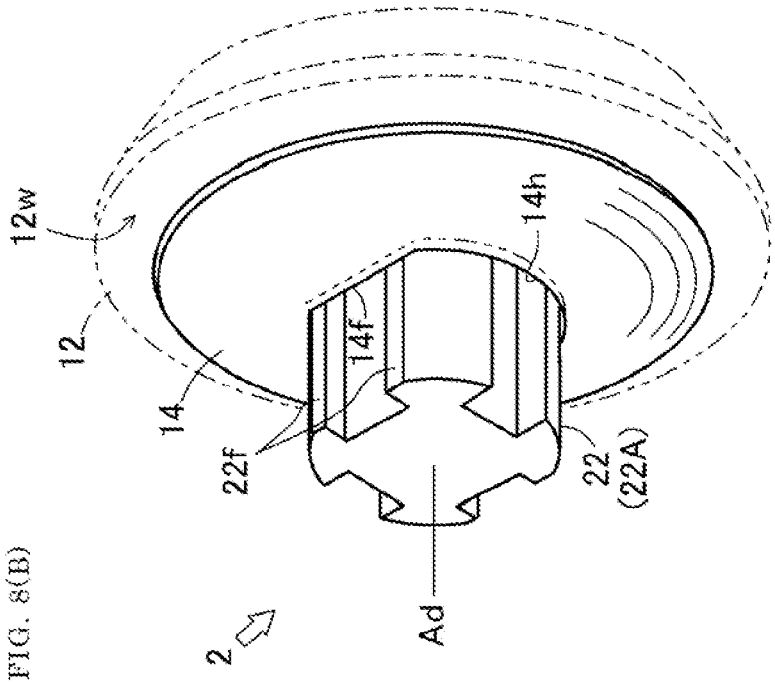
FIGS. 8A and 8B are views taken in directions of arrow Fx in FIG. 5 and arrow Fy in FIG. 6, respectively.
Figure 8B:
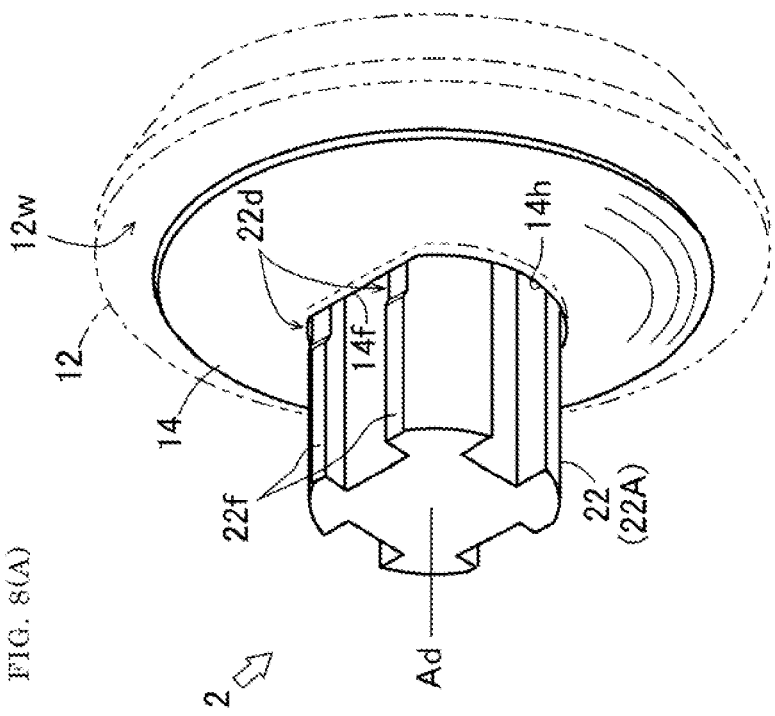

FIGS. 8A and 8B are views taken in directions of arrow Fx in FIG. 5 and arrow Fy in FIG. 6, respectively.

Each of the washers 14 used in the differential unit 1 has a shaft hole 14*h* whose shape is not circular. Specifically, the shaft hole 14*h* of the washer 14 has a substantially circular shape which is partially straight. In other words, the washer 14 has a flat surface portion 14*f* formed in a thickness direction thereof.

As described above, the washers 14 are supported in the predetermined positions in the longitudinal direction of the dummy shaft 2 while in contact with (at least in close proximity to) the outer surfaces 12*w* of the respective pinion gears 12. At this time, the washer 14 is caught in the receiving groove 22*d* (see FIG. 7A). Specifically, the flat surface portion 14*f* of the washer 14 and the bottom surface 22*db* of the receiving groove 22*d* come in contact with each other.

Furthermore, the washer 14 moves out of the receiving groove 22*d* and gets hung on the flat surface portion 22*f* as each of the movable portions 22 (22A, 22B) slides (see FIG. 7B). Specifically, the flat surface portion 14*f* of the washer 14 and the flat surface portion 22*f* of each of the movable portions 22 (22A, 22B) come in contact with each other. In other words, the flat surface portion 22*f* of the dummy shaft 2 and the flat surface portion 14*f* of the washer 14 come in contact with each other.

In this manner, the receiving grooves 22*d* are fit with the washers 14, and thereby the dummy shaft 2 restricts rotation of the washers 14. Moreover, the movable portions 22 (22A, 22B) are fit with the washers 14, and thereby the dummy shaft 2 restricts rotation of the washers 14. Accordingly, the washers 14 do not turn (the washers 14 do not turn to be displaced in the longitudinal direction of the dummy shaft 2), and thereby can be prevented from falling off.

In addition, when the dummy shaft 2 restricts rotation of the washers 14 as the bottom surfaces 22*db* of the receiving grooves 22*d* and the flat surface portions 14*f* formed in the washers 14 come in contact with each other, the bottom surfaces 22*db* of the receiving grooves 22*d* face upward in a vertical direction (the bottom surfaces 22*db* face upward). Moreover, when the dummy shaft 2 restricts rotation of the washers 14 as the flat surface portions 22*f* of the movable portions 22 (22A, 22B) and the flat surface portions 14*f* formed in the washers 14 come in contact with each other, the flat surface portions 22*f* of the movable portions 22 (22A, 22B) face upward in the vertical direction (the flat surface portions 22*f* face upward). Accordingly, friction acting on the washers 14 becomes large (the washers 14 do not slide to be displaced in the longitudinal direction of the dummy shaft 2), thus enabling to further prevent the washers 14 from falling off.

Next, an assembling apparatus 3 for assembling the differential unit 1 is described.

Figure 9:
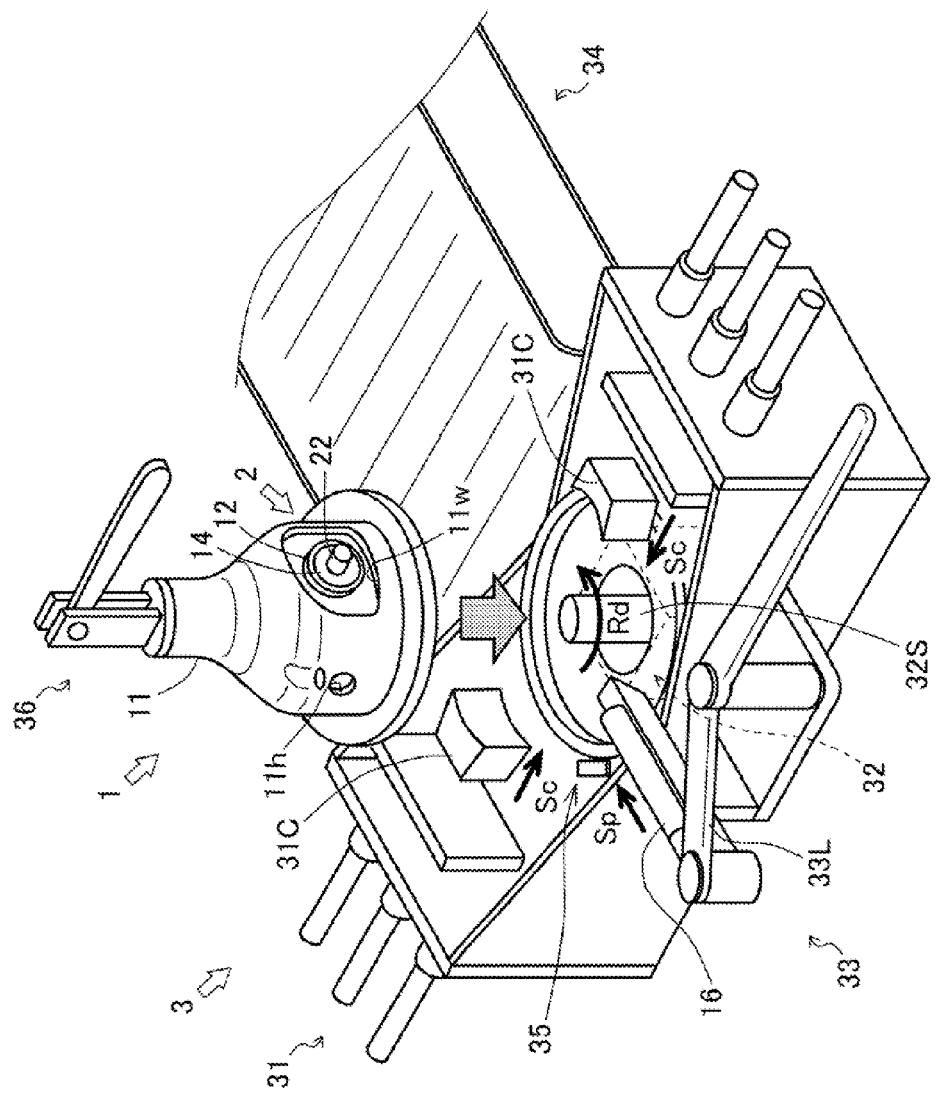
FIG. 9 shows an apparatus for assembling the differential unit.

FIG. 9 shows the assembling apparatus 3 for assembling the differential unit 1.

The assembling apparatus 3 for assembling the differential unit 1 mainly includes a pushing device 31, a turning device 32, and a replacing device 33.

The pushing device 31 includes a pair of chucks 31C facing each other. The pair of chucks 31C is moved by an electric motor, and can move in such directions as to move close to each other (see arrows Sc). Therefore, the respective chucks 31C can push the movable portions 22 (22A, 22B) protruding from operation windows 11*w* into the differential case 11. In other words, the pushing device 31 can slide the movable portions 22 (22A, 22B) toward the body portion 21. This makes it possible to move the washers 14 to the predetermined positions (see FIG. 7B).

The turning device 32 includes one clamp shaft 32S. The clamp shaft 32S is moved by an electric motor, and can grasp the dummy shaft 2. The clamp shaft 32S is moved by the electric motor, and can turn in one direction (see arrow Rd). Therefore, the clamp shaft 32S can turn the dummy shaft 2 to a predetermined angle. In other words, the turning device 32 can properly change orientation of the dummy shaft 2.

The replacing device 33 includes one pushing arm 33L. The pushing arm 33L can be turned by an operator, and can send out the pinion shaft 16 (see arrow Sp). Therefore, the pushing arm 33L can insert the pinion shaft 16 into the differential case 11 through the shaft hole 11*h* to push the dummy shaft 2. In other words, the replacing device 33 can push the dummy shaft outward 2 by using the pinion shaft 16.

Furthermore, the assembling apparatus 3 according to the present embodiment includes a conveying device 34 and a fixing device 35. The conveying device 34 can place the temporarily-assembled differential unit 1 on the fixing device 35. The fixing device 35 can fix the temporarily-assembled differential unit 1 to a predetermined position. A jig 36 is used for supporting the side gears 13 or the like in predetermined positions. The jig 36 is conventionally existing one, and therefore is not described (see JP 2006-123019 A, for example).

A method for manufacturing the differential unit 1 is described below, and a manner of operation of the assembling apparatus 3 is described below.

Figure 10:
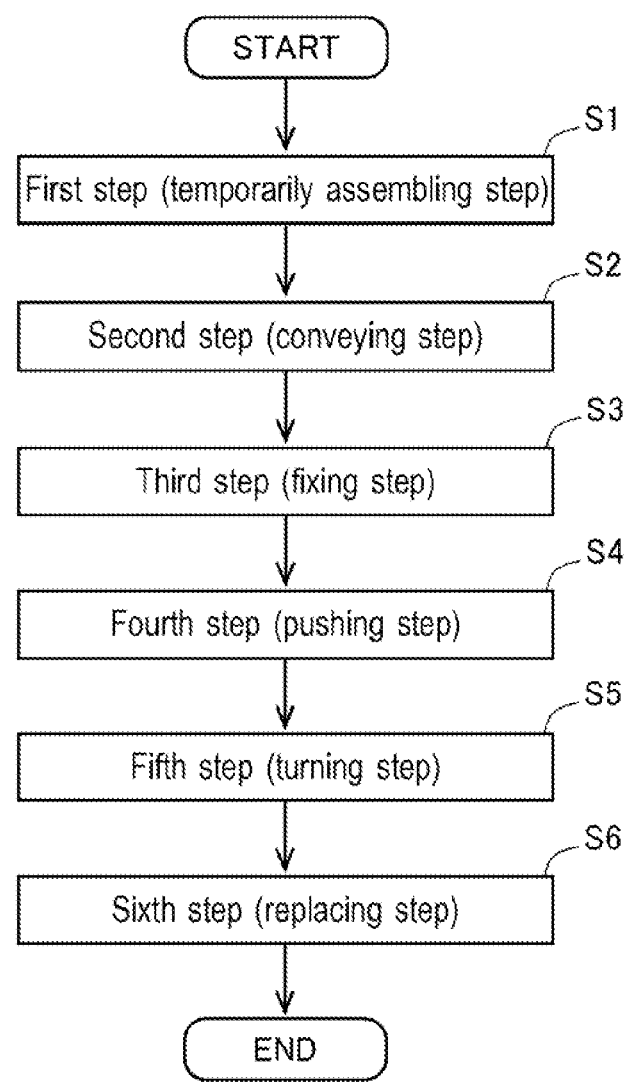
FIG. 10 shows a method for manufacturing the differential unit.
Figure 11:
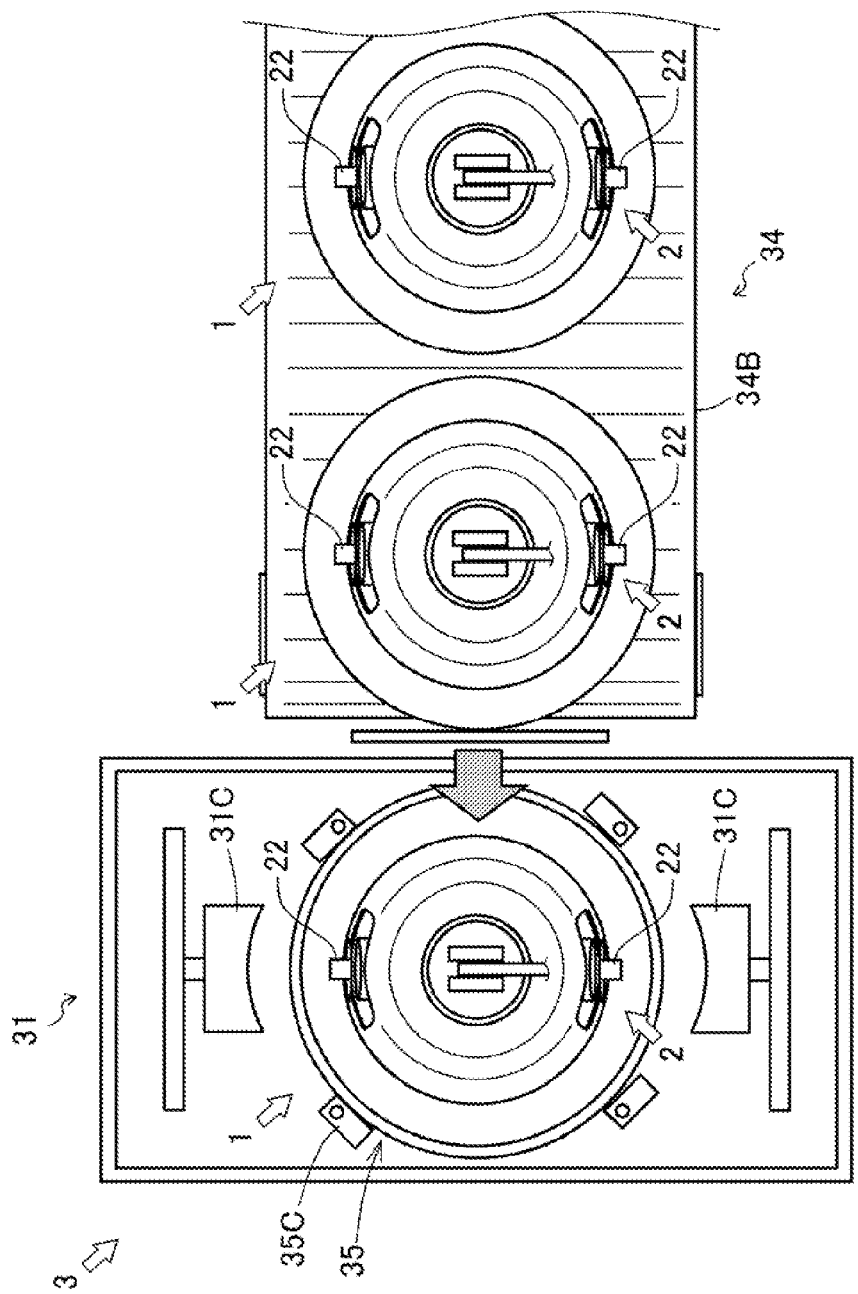
FIG. 11 shows a conveying step.
Figure 12:
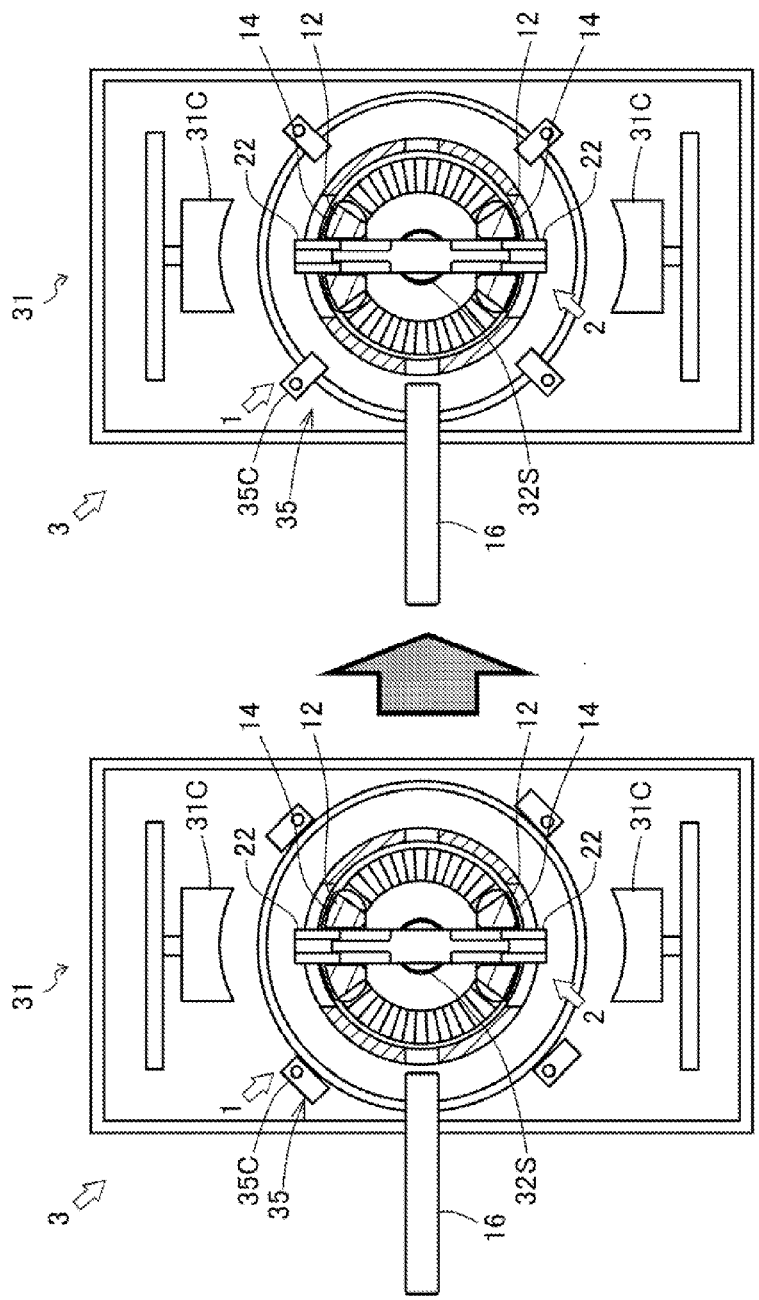
FIG. 12 shows a fixing step.
Figure 13:
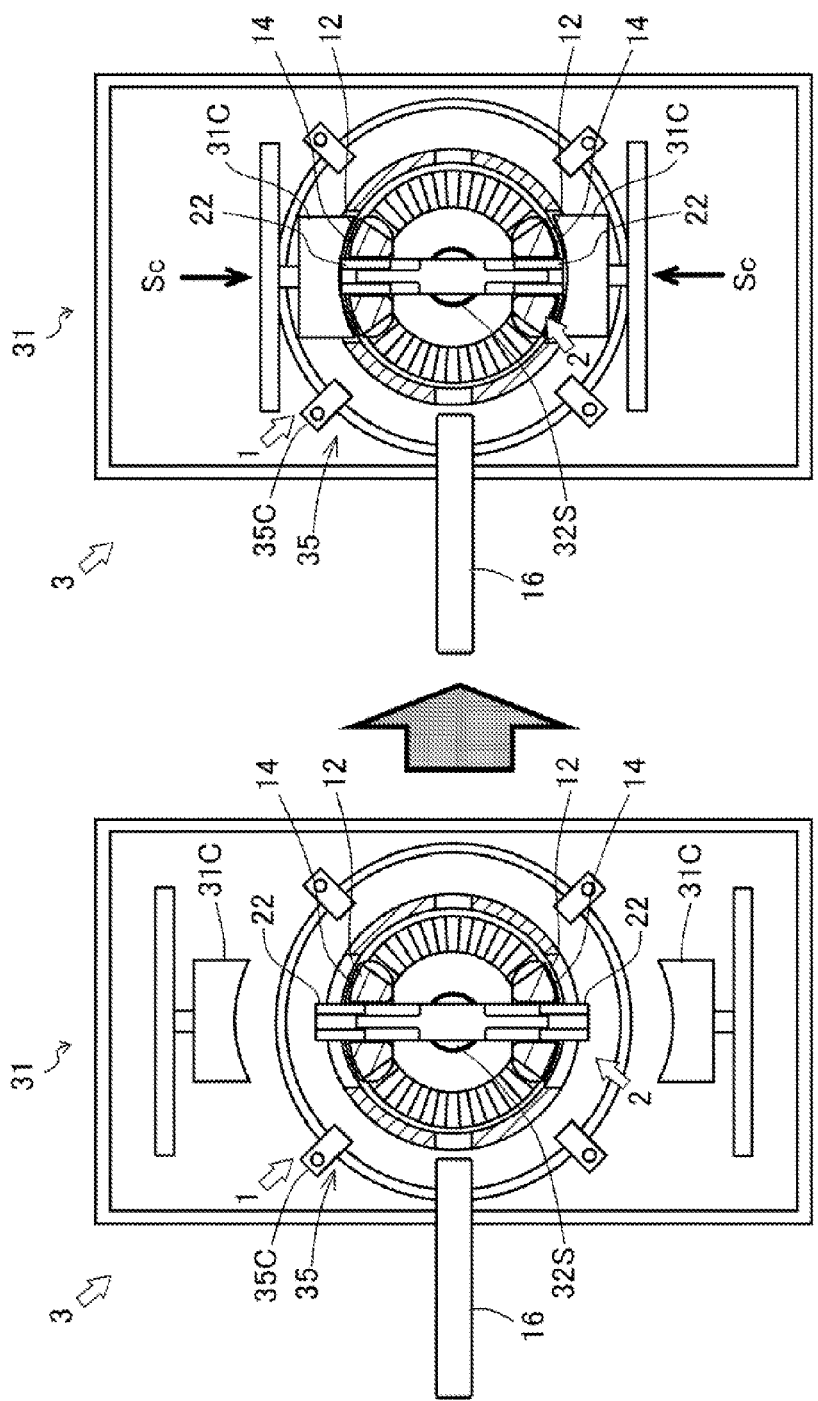
FIG. 13 shows a pressing step.
Figure 14:
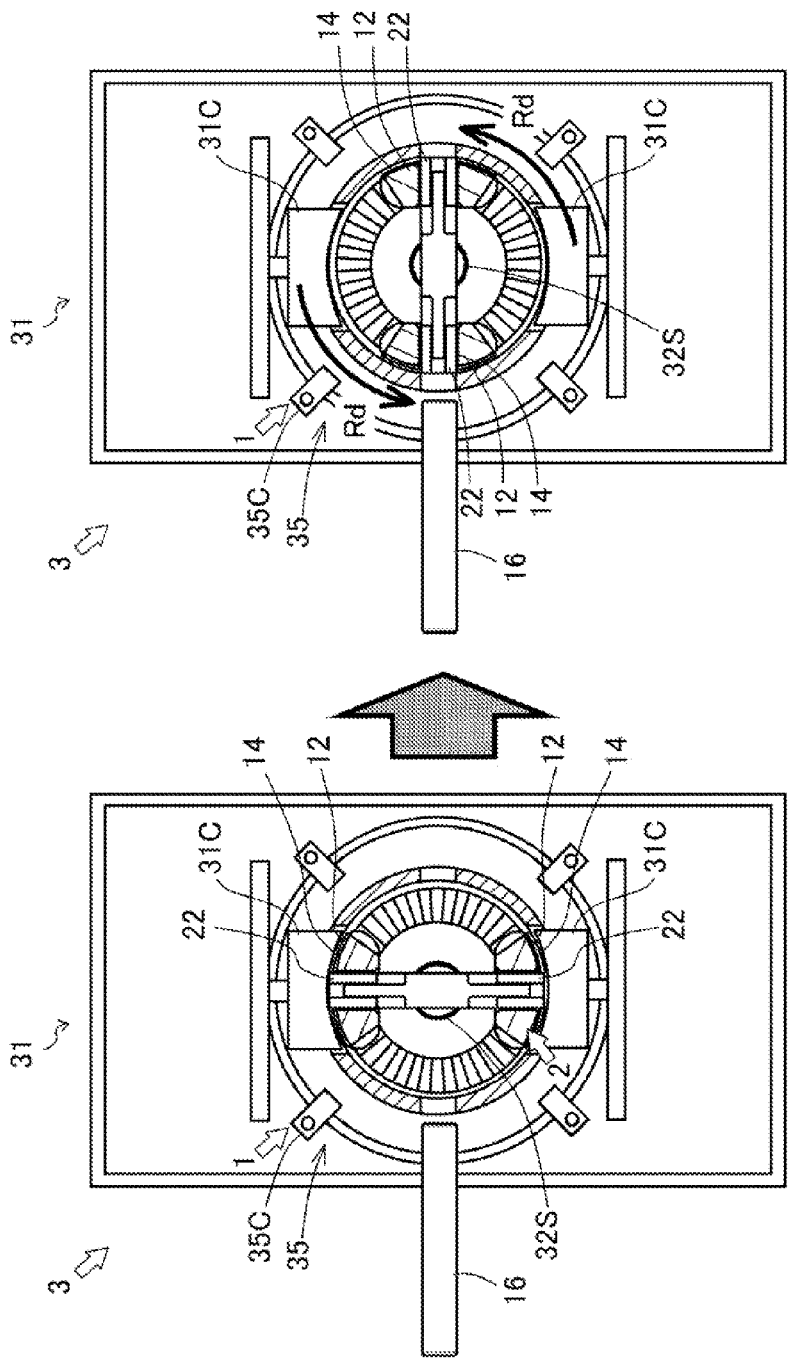
FIG. 14 shows a turning step.
Figure 15:
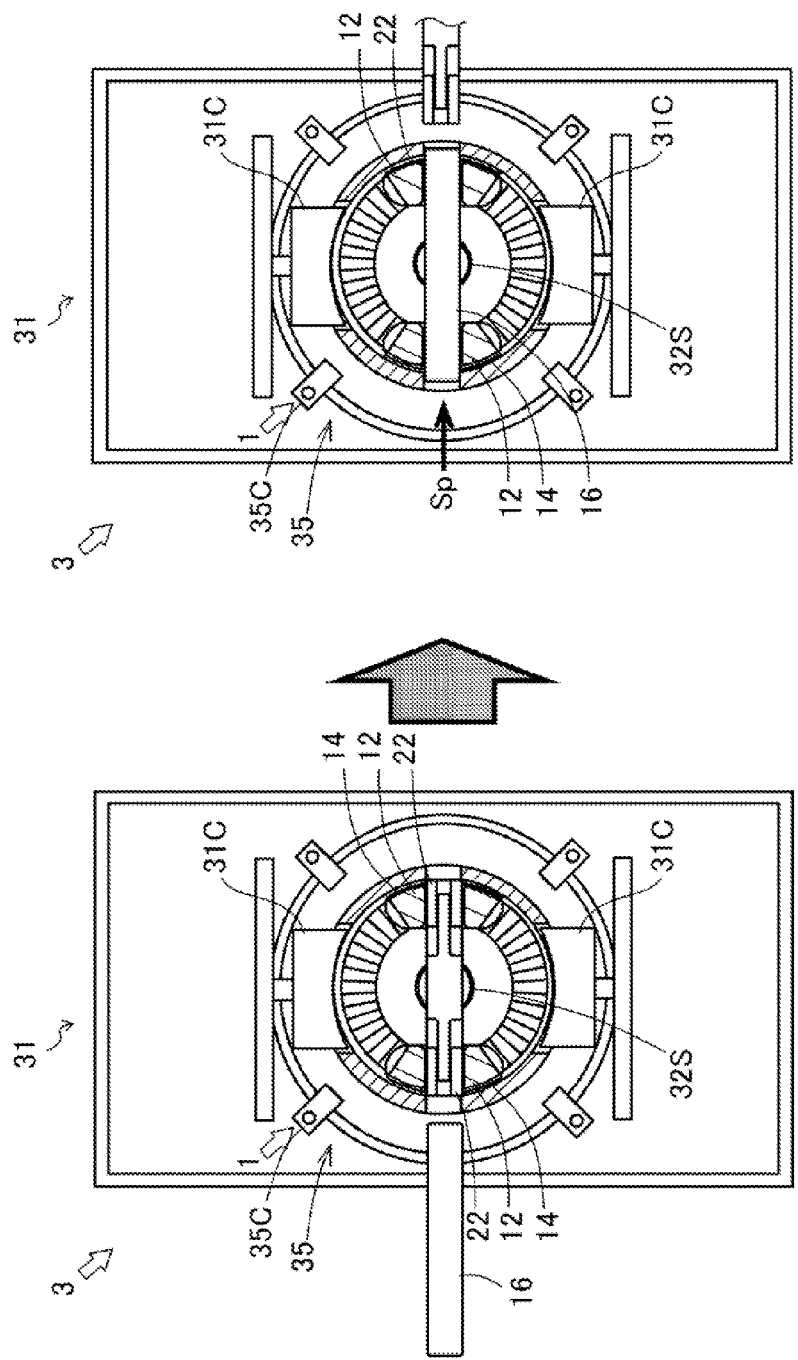
FIG. 15 shows a replacing step.

FIG. 10 shows the method for manufacturing the differential unit 1. FIGS. 11 to 15 show a conveying step, a fixing step, a pushing step, a turning step and a replacing step, respectively.

A First step S1 is a step for arranging the side gears 13, conical springs, and a side shim in the differential case 11. These are supported by the jig 36. Moreover, the first step S1 is a step for arranging the pinion gears 12 and the washers 14 in the differential case 11. These are supported by the dummy shaft 2. In other words, the first step S1 is a "temporarily assembling step" for temporarily assembling the differential unit 1.

A second step S2 is a step for conveying the differential unit 1. In other words, the second step S2 is the "conveying step" for conveying the differential unit 1 (see FIG. 11). The differential unit 1 is placed on the fixing device 35 by the conveying device 34. Although the conveying device 34 is a conveyor belt 34B, the conveying device 34 may be another conveying device such as a robot arm, and the present invention is not limited thereto.

A third step S3 is a step for fixing the differential unit 1. In other words, the third step S3 is the "fixing step" for fixing the differential unit 1 (see FIG. 12). The differential unit 1 is fixed in a predetermined position and in a predetermined orientation by the fixing device 35. Although the fixing device 35 fixes the differential unit 1 by using a clamp mechanism 35C, the clamp mechanism 35C may be another fixing device such as a positioning pin, and the present invention is not limited thereto.

A fourth step S4 is a step for pushing the movable portions 22 (22A, 22B) inward. In other words, the fourth step S4 is the "pushing step" for pushing the movable portions 22 (22A, 22B) inward (see FIG. 13). The movable portions 22 (22A, 22B) are pushed into the differential case 11 by the pushing device 31. Although the pushing device 31 pushes the movable portions 22 inward by using the chucks 31C, the present invention is not limited thereto.

A fifth step S5 is a step for turning the dummy shaft 2. In other words, the fifth step S5 is the "turning step" for turning the dummy shaft 2 (see FIG. 14). The dummy shaft 2 is turned to the predetermined angle by the turning device 32. Although the turning device 32 turns the dummy shaft 2 by using the clamp shaft 32S, the present invention is not limited thereto.

A sixth step S6 is a step for replacing the dummy shaft 2 with the pinion shaft 16. In other words, the sixth step S6 is the "replacing step" for replacing the dummy shaft 2 with the pinion shaft 16 (see FIG. 15). The dummy shaft 2 is replaced with the pinion shaft 16 by the replacing device 33. Although the replacing device 33 replaces the dummy shaft 2 with the pinion shaft 16 by using the pushing arm 33L, the present invention is not limited thereto.

Next, an assembling apparatus 4 according to another embodiment is described.

Although the assembling apparatus 4 has substantially the same structure as the assembling apparatus 3, the conveying device 34 is not a component of the assembling apparatus 4. In other words, the assembling apparatus 4 does not include the conveying device 34. In this case, the "conveying step" means distribution until a differential unit 1 is placed on the fixing device 35.

REFERENCE SIGNS LIST

1: differential unit
11: differential case
12: pinion gear
12w: outer surface
13: side gear
14: washer
14f: flat surface portion
15: final gear
16: pinion shaft
2: dummy shaft
21: body portion
21G: guide
21f: flat surface portion
22: movable portion
22d: receiving groove
22db: bottom surface
22dr: slope
22f: flat surface portion
22r: rail
23: spring
3: assembling apparatus
31: pushing device
31C: chuck
32: turning device
32S: clamp shaft
33: replacing device
33L: pushing arm
34: conveying device
35: fixing device
4: assembling apparatus
Ad: axis

What is claimed is:

1. An apparatus for assembling a differential unit, comprising:
   a dummy shaft configured for temporarily assembling the differential unit by being inserted into a pinion gear and a washer in contact with an outer surface of the pinion gear, the dummy shaft comprising:
     a body portion; and
     first and second movable portions located at opposite longitudinal ends of the dummy shaft and having, respectively, first and second receiving grooves configured to catch the washer, each of the movable portions being slidable in a direction toward or away from the body portion;
   a fixing device for fixing the differential unit in a first predetermined position, the differential unit being in a temporarily assembled state where the dummy shaft is inserted into the pinion gear and the washer so that the washer is caught in the first receiving groove of the dummy shaft; and
   a pushing device for pushing the dummy shaft inward by using a chuck,
   wherein the pushing device slides the first movable portion toward the body portion by using the chuck to move an end of the first receiving groove farthest from the body portion inward of the outer surface of the pinion gear, thereby causing the washer caught in the first receiving groove to move out of the first receiving groove such that the washer moves to a second predetermined position.

2. The apparatus according to claim 1, further comprising:
a replacing device for sending a pinion shaft into the differential unit which is turned into a third predetermined position after the pushing device pushes the dummy shaft inward,
wherein the replacing device pushes the dummy shaft outward by using the pinion shaft to replace the dummy shaft with the pinion shaft.

3. The apparatus according to claim 1, further comprising:
a conveying device for the differential unit,
wherein the conveying device places the temporarily assembled differential unit on the fixing device.

4. A method for manufacturing a differential unit using a dummy shaft comprising: (i) a body portion and (ii) first and second movable portions located at opposite longitudinal ends of the dummy shaft and having respectively, first and second receiving grooves configured to catch a washer, each of the movable portions being slidable in a direction toward or away from the body portion,
the method for manufacturing the differential unit comprising the following steps:
bringing the differential unit into a temporarily assembled state where the dummy shaft is inserted into the pinion gear and the washer so that the washer is caught in the first receiving groove of the dummy shaft and is in contact with an outer surface of the pinion gear;
fixing the temporarily assembled differential unit in a first predetermined position; and
pushing the dummy shaft inward by using a chuck,
wherein the pushing step includes sliding the first movable portion toward the body portion by using the chuck to move an end of the first receiving groove farthest from the body portion inward of the outer surface of the pinion gear, thereby causing the washer caught in the first receiving groove to move out of the first receiving groove such that the washer moves to a second predetermined position.

5. The method according to claim 4, further comprising:
sending a pinion shaft into the differential unit, which is turned into a third predetermined position, after the dummy shaft is pushed inward through the pushing step,
wherein the sending step includes pushing the dummy shaft outward by using the pinion shaft to replace the dummy shaft with the pinion shaft.

6. The method according to claim 4, further comprising:
conveying the differential unit after the temporarily bringing step,
wherein the conveying step includes sending the temporarily assembled differential unit to the fixing step.

7. The apparatus according to claim 1,
wherein the receiving groove of the dummy shaft includes a bottom that is recessed from an outermost surface of the dummy shaft.

8. The apparatus according to claim 7,
wherein the washer contacts the bottom when caught in the receiving groove.

* * * * *